US008400801B2

(12) United States Patent
Shinoda

(10) Patent No.: US 8,400,801 B2
(45) Date of Patent: Mar. 19, 2013

(54) WIRELESS POWER TRANSFER TERMINAL

(75) Inventor: Satoshi Shinoda, Kyoto-fu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 13/281,133

(22) Filed: Oct. 25, 2011

(65) Prior Publication Data
US 2012/0039102 A1 Feb. 16, 2012

Related U.S. Application Data

(63) Continuation of application No. PCT/JP2010/054185, filed on Mar. 12, 2010.

(30) Foreign Application Priority Data

Apr. 27, 2009 (JP) ................................ 2009-107743

(51) Int. Cl.
*H02M 7/537* (2006.01)
(52) U.S. Cl. ........................................................ 363/131
(58) Field of Classification Search .................... 363/16, 363/17, 123, 131
See application file for complete search history.

(56) References Cited

U.S. PATENT DOCUMENTS

| 5,831,348 A | 11/1998 | Nishizawa |
| 6,078,512 A | 6/2000 | Bouvier |
| 7,109,682 B2 | 9/2006 | Takagi et al. |
| 2001/0009516 A1* | 7/2001 | Kato .............................. 363/17 |
| 2008/0197802 A1 | 8/2008 | Onishi et al. |
| 2009/0192655 A1 | 7/2009 | Ichikawa et al. |
| 2009/0236916 A1 | 9/2009 | Nishimura |

FOREIGN PATENT DOCUMENTS

| JP | 62-163576 A | 7/1987 |
| JP | 08-019985 A | 1/1996 |
| JP | 09-308134 A | 11/1997 |
| JP | 2001-008380 A | 1/2001 |
| JP | 2002-514377 A | 5/2002 |
| JP | 2005-143181 A | 6/2005 |
| JP | 2005-295627 A | 10/2005 |
| JP | 2006-60910 A | 3/2006 |

OTHER PUBLICATIONS

International Search Report; PCT/JP2010/054185; Apr. 13, 2010.
Written Opinion of the International Searching Authority; PCT/JP2010/054185; Apr. 13, 2010.

* cited by examiner

*Primary Examiner* — Shawn Riley
(74) *Attorney, Agent, or Firm* — Studebaker & Brackett PC; Tim L. Brackett, Jr.; John E. Guay

(57) ABSTRACT

This disclosure provides a wireless power transfer terminal that enables a power device to be used for both power transmission and power reception and allows space savings of circuits and a reduction in the cost of manufacturing. The wireless power transfer terminal includes first through fourth switching elements, a coil, and a control circuit. Each of two sets of switching elements forms a series circuit, and the two sets are connected in parallel to each other. The coil is connected between connection points of the switching elements of the series circuits. The control circuit performs switching control of the first to fourth switching elements in a power transmission mode and in a power reception mode.

20 Claims, 6 Drawing Sheets

WIRELESS POWER TRANSFER TERMINAL

CROSS REFERENCE TO RELATED APPLICATIONS

The present application is a continuation of International Application No. PCT/JP2010/054185 filed Mar. 12, 2010, which claims priority to Japanese Patent Application No. 2009-107743 filed Apr. 27, 2009, the entire contents of each of these applications being incorporated herein by reference in their entirety.

TECHNICAL FIELD

The present invention relates to a wireless power transfer terminal that transmits and receives power to and from an electronic device in a noncontact manner.

BACKGROUND

Traditionally, a wireless power transfer terminal used for both transmission and reception that can both receive and transmit power by wireless power transfer has been proposed. See, for example, Japanese Unexamined Patent Application Publication No. 2006-60910 (Patent Literature 1). Such a wireless power transfer terminal can be utilized as an auxiliary power source of an electronic device, such as a cellular phone terminal or a potable player, and in giving power to and receiving power from other electronic devices.

FIG. 1 is a circuit diagram of a traditional wireless power transfer terminal 101 to which Patent Literature 1 is refers. This wireless power transfer terminal 101 includes a coil 102 used for both transmitting and receiving power via a respective power transmission circuit 103 and a power reception circuit 104. The power transmission circuit 103 includes an inverter for converting an input voltage from, for example, a battery, into an alternating-current output. The coil 102 used, for both transmission and reception, transmits power to a partner device over an electromagnetic field excited in the coil 102 by application of an alternating-current output from the power transmission circuit 103, and receives power from the partner device over an electromagnetic field output from the partner device. The power reception circuit 104 includes a rectifier circuit for converting an alternating-current that has been excited (input) in the coil 102 into an output voltage.

SUMMARY

Embodiments consistent with the present disclosure provide a wireless power transfer terminal that enables a power device to be used for both power transmission and power reception, and can allow space savings of circuits and a reduction in the cost of manufacturing.

In an aspect of the disclosure, a wireless power transfer terminal includes a parallel circuit, a coil, and a control unit. The parallel circuit includes first and second series circuits connected in parallel between opposed ends of the parallel circuit. The first series circuit includes first and second semiconductor switching elements connected in series to each other. The second series circuit includes third and fourth semiconductor switching elements connected in series to each other. The coil is connected between a connection point of the first semiconductor switching element and the second semiconductor switching element and a connection point of the third semiconductor switching element and the fourth semiconductor switching element. The control unit is configured to perform switching control of at least the first to fourth semiconductor switching elements.

In a more specific embodiment, the control unit may be configured to perform switching control of at least the first to fourth semiconductor switching elements in such a manner that, in a power transmission mode, the parallel circuit operates as a full-bridge inverter circuit that forms, from an input to the opposed ends of the parallel circuit, an alternating-current output to the coil, and in power reception mode, the parallel circuit operates as a full-wave rectifier circuit that forms, from an alternating-current input to the coil, an output to the opposed ends of the parallel circuit.

In another more specific embodiment, in the power transmission mode the control unit may be configured to switch between a state in which the first semiconductor switching element and the fourth semiconductor switching element are on and the second semiconductor switching element and the third semiconductor switching element are off, and a state in which the first semiconductor switching element and the fourth semiconductor switching element are off and the second semiconductor switching element and the third semiconductor switching element are on at specific periods. In the power reception mode, the control unit may be configured to turn off, of the first to fourth semiconductor switching elements, at least one of the first to fourth semiconductor switching elements that is connected to a terminal of a power reception load to which a positive voltage is applied and to a terminal of the coil at which a negative voltage is excited and one of the first to fourth semiconductor switching elements that is connected to a terminal of the power reception load to which a negative voltage is applied and to a terminal of the coil at which a positive voltage is excited.

In yet another more specific embodiment, the wireless power transfer terminal may further include a resonant capacitor connected in series to the coil and a switch unit connected in parallel to the resonant capacitor, and the control unit may preferably be configured to, for power transmission, turn off the switch unit and make the resonant capacitor resonate with the coil and, for power reception, turn on the switch unit and electrically bypass the resonant capacitor.

In another more specific embodiment, each of the semiconductor switching elements may be an FET element.

In still another more specific embodiment, the wireless power transfer terminal may further include a secondary cell and a buck-boost converter circuit. The buck-boost converter circuit may be configured to, for the power transmission mode, increase a voltage between opposed ends of the secondary cell and apply the increased voltage to the opposed ends of the parallel circuit and, for the power reception mode, decrease a voltage between the opposed ends of the parallel circuit and apply the decreased voltage to the secondary cell.

In another more specific embodiment, the control unit may be configured to carry out mutual device authentication communication with a partner device coupled to the coil and variably control transmitting power or received power according to the partner device.

DETAILED DESCRIPTION

A traditional wireless power transfer terminal that includes a coil used for both transmission and reception requires a plurality of semiconductor switching elements (power devices) for each of a power transmission circuit and a power reception circuit. The inventor realized these requirements make the terminal's circuit configuration large and complex and hinders space savings of the circuits and a reduction in the cost of manufacturing.

A wireless power transfer terminal according to a first embodiment of the present disclosure will now be described with reference to FIGS. 2A to 3B.

FIGS. 2A to 3B are circuit diagrams of a wireless power transfer terminal 1 according to the present embodiment. The arrows with the broken lines in FIGS. 2A and 2B indicate a current for power transmission mode and those in FIGS. 3A and 3B indicate a current for power reception mode.

The wireless power transfer terminal 1 includes FETs 2A to 2D, a coil L, and a control circuit 3. The FETs 2A to 2D are N-channel MOS FETs and correspond to first to fourth semiconductor switching elements in the present disclosure. The drain of the FET 2A and the drain of the FET 2C are connected together through a node N1. The source of the FET 2B and the source of the FET 2D are connected together through a node N2. The source of the FET 2A and the drain of the FET 2B are connected together through a node N3. The source of the FET 2C and the drain of the FET 2D are connected together through a node N4. The gate of each of the FETs 2A to 2D is connected to the control circuit 3. The node N1 is connected to an input/output node NA. The node N2 is connected to an input/output node NB. The node N3 is connected to one end of the coil L, and the node N4 is connected to the other end of the coil L.

Of the connection structure of the present embodiment, a connection path that extends through the FET 2A, node N3, and FET 2B between the node N1 and node N2 forms a first series circuit, a connection path that extends through the FET 2C, node N4, and FET 2D between the node N1 and node N2 forms a second series circuit, and a connection path that extends through the FETs 2A to 2D between the node N1 and node N2 forms a parallel circuit.

Figure 1:
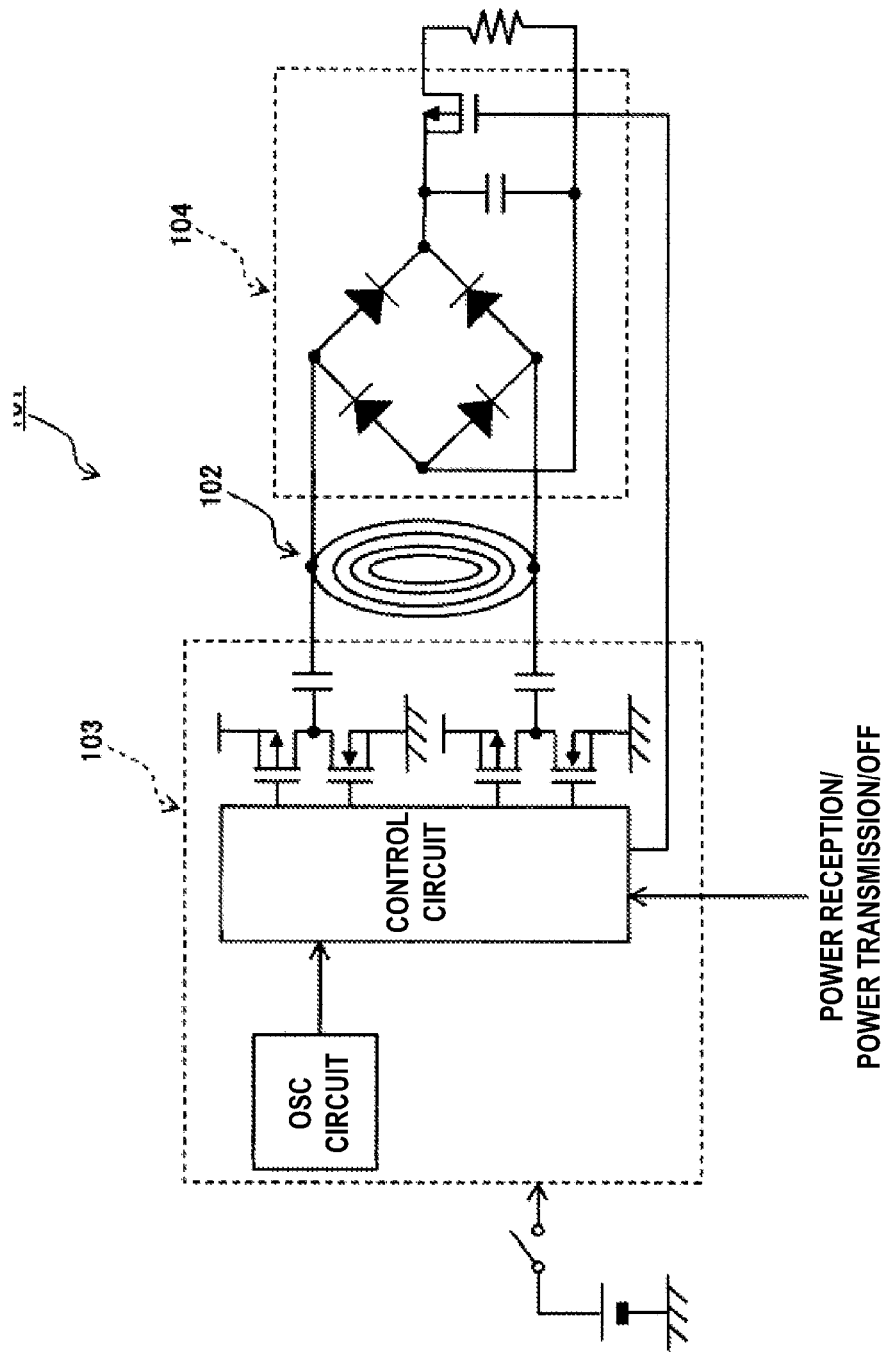
FIG. 1 is a circuit diagram of a traditional wireless power transfer terminal.
Figure 2A:
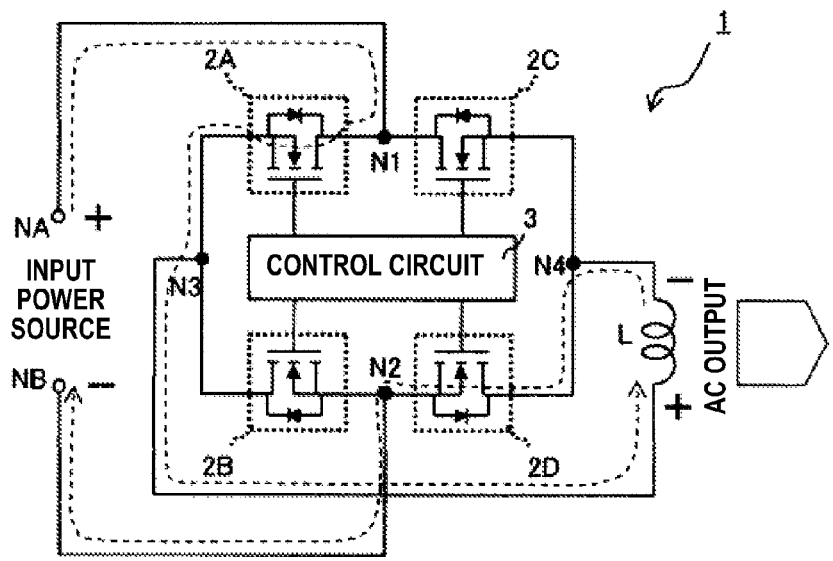
FIGS. 2A and 2B are circuit diagrams of a wireless power transfer terminal according to a first exemplary embodiment.
Figure 2B:
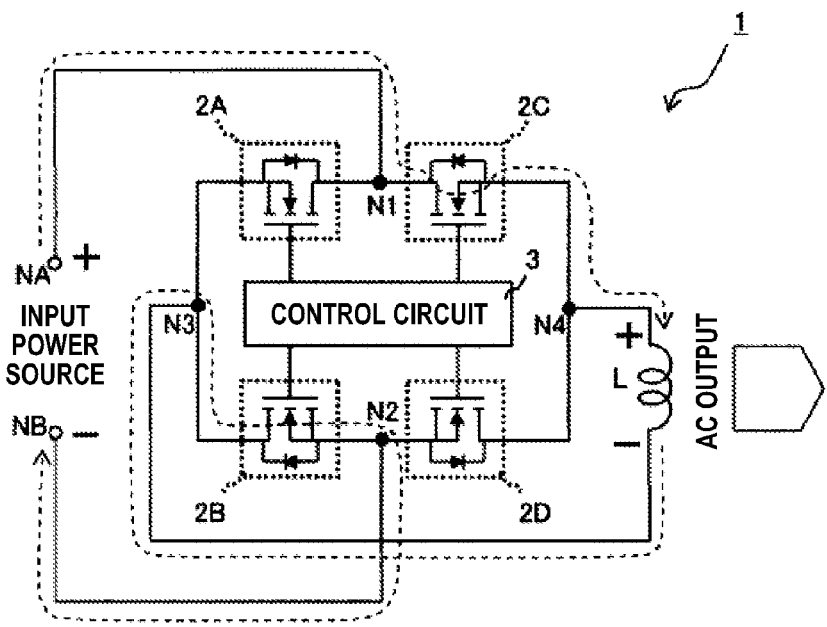

For a power transmission mode of the wireless power transfer terminal 1 illustrated in FIGS. 2A and 2B, a positive voltage is applied from the input power source to the input/output node NA and a negative voltage is applied from the input power source to the input/output node NB. A partner device in power reception mode is arranged in the vicinity of the coil L. In this state, the control circuit 3 changes the gate control voltage of each of the FETs 2A to 2D at predetermined periods. Specifically, the FETs 2A and 2D and the FETs 2B and 2C are alternately turned on and off such that the FETs 2A to 2D function as a full-bridge inverter circuit.

FIG. 2A illustrates a state in which the FETs 2A and 2D are on and the FETs 2B and 2C are off in a half period of an alternating-current output. In this status, a current from the input power source passes through the input/output node NA, node N1, FET 2A, and node N3 and enters one end of the coil L. The current flowing from the other end of the coil L passes through the node N4, FET 2D, node N2, and input/output node NB and returns to the input power source.

FIG. 2B illustrates a state in which the FETs 2A and 2D are off and the FETs 2B and 2C are on in a half period of an alternating-current output. In this state, a current from the input power source passes through the input/output node NA, node N1, FET 2C, and node N4 and enters one end of the coil L. The current flowing from the other end of the coil L passes through the node N3, FET 2B, node N2, and input/output node NB and returns to the input power source.

Accordingly, alternately turning on the FETs 2A and 2D and the FETs 2B and 2C leads to application of an alternating-current output in which the direction of a current passing through the coil L is repeatedly inverted and thus excites a near electromagnetic field. Therefore, power can be transmitted to a partner device in power reception mode coupled to the near electromagnetic field of the coil L.

To prevent shoot-through currents caused by a state in which the FETs 2A and 2D and the FETs 2B and 2C are on at the same time, an appropriate dead time for which the FETs 2A to 2D are all off may preferably be provided.

Figure 3A:
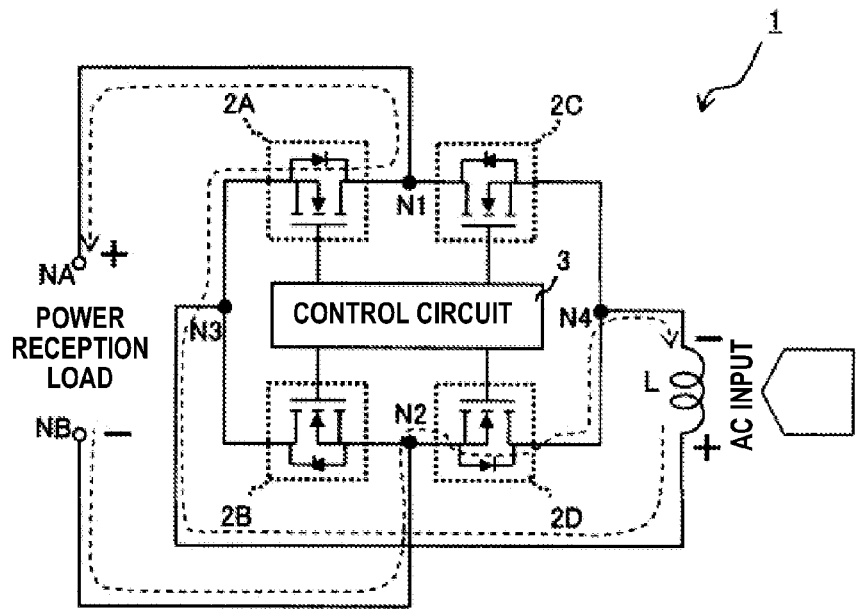
FIGS. 3A and 3B are illustrations for describing operations of the wireless power transfer terminal illustrated in FIG. 2.
Figure 3B:
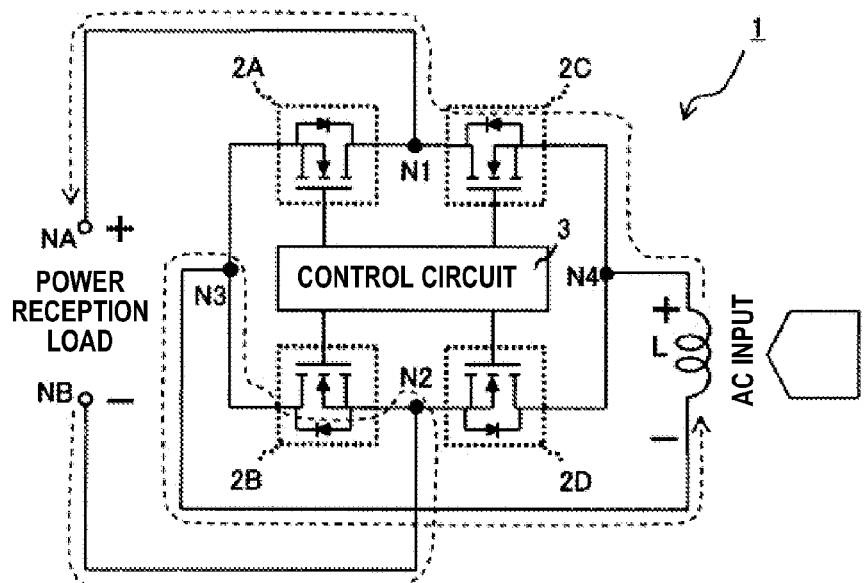

For a power reception mode of the wireless power transfer terminal 1 illustrated in FIGS. 3A and 3B, a partner device in power transmission mode is arranged in the vicinity of the coil L, the coil L is coupled to a near electromagnetic field of the partner device, and an alternating-current input is excited in the coil L. In this state, the control circuit 3 controls the gate control voltage such that the FETs 2A to 2D remain in the off state, and makes the parallel circuit of the FETs 2A to 2D function as a full-wave rectifier circuit using a parasitic diode between the drain and the source of each of the FETs 2A to 2D.

FIG. 3A illustrates a state in which a positive voltage is excited at one end of the coil L that is connected to the node N3 and a negative voltage is excited at another end of the coil L that is connected to the node N4 in a half period of an alternating-current input. In this state, a current from one end of the coil L at which the positive voltage is excited passes through the node N3, FET 2A, node N1, and input/output node NA and enters a power reception load. The current flowing from the power reception load passes through the input/output node NB, node N2, FET 2D, and node N4 and returns to one end of the coil L at which the negative voltage is excited. Therefore, the positive voltage from the input/output node NA and the negative voltage from the input/output node NB are applied to the power reception load.

At this time, the gate control voltage may be controlled such that the FETs 2A and 2D are in the on state. With this control, the loss can be reduced in comparison with the parasitic diode, and rectification efficiency can be improved.

FIG. 3B illustrates a state in which a negative voltage is excited at one end of the coil L that is connected to the node N3 and a positive voltage is excited at another end of the coil L that is connected to the node N4 in a half period of an alternating-current input. In this state, a current from one end of the coil L at which the positive voltage is excited passes through the node N4, FET 2C, node N1, and input/output node NA and enters the power reception load. The current flowing from the power reception load passes through the input/output node NB, node N2, FET 2B, and node N3 and returns to one end of the coil L at which the negative voltage is excited. Therefore, the positive voltage from the input/output node NA and the negative voltage from the input/output node NB are applied to the power reception load.

At this time, the gate control voltage may be controlled such that the FETs 2B and 2C are in the on state. With this control, the loss can be reduced in comparison with the parasitic diode, and rectification efficiency can be improved.

Accordingly, even if the direction of a current flown through the coil L by excitation of an alternating-current input is repeatedly inverted, the power reception load can always receive a positive voltage applied from the input/output node NA and a negative voltage applied from the input/output node NB and can receive power from a partner device.

In the case in which the gate control voltage is controlled such that the FETs 2A and 2D or the FETs 2B and 2C are in the on state, in order to prevent shoot-through currents caused by a situation where the FETs 2A and 2D and the FETs 2B and 2C are all in the on state at the same time, an appropriate dead time for the FETs 2A to 2D are all off may preferably be provided.

The above described parallel circuit including first to fourth semiconductor switching elements (i.e., FETs 2A to 2D) operating as a full-bridge inverter circuit can apply an alternating-current output to the coil, thus enabling the wireless power transfer terminal to transmit power. Also, the parallel circuit including the first to fourth semiconductor switching elements operating as a rectifier circuit can rectify an alternating-current input applied from the coil, thus enabling the wireless power transfer terminal to receive power. In this way, the use of the parallel circuit including the first to fourth semiconductor switching elements as a full-bridge inverter circuit or a full-wave rectifier circuit can reduce the total number of the semiconductor switching elements, increase space savings of the circuit configuration of the wireless power transfer terminal 1, and reduce cost of manufacturing.

For the present embodiment, an FET element is used as a semiconductor switching element. With this, the parallel circuit can operate as a full-wave rectifier circuit using a parasitic diode between the drain and the source of the FET element. However, embodiments consistent with the disclosure can also be suitably carried out using other semiconductor switching elements. For example, a combination of a bipolar transistor and a diode can also be used as substantially the same circuit configuration as that of the present embodiment, and with other embodiments consistent with this disclosure.

A wireless power transfer terminal according to a second exemplary embodiment will now be described with reference to FIG. 4. In the following description, the same reference numerals are used for substantially the same configuration as in the first exemplary embodiment, and description thereof is provided above.

Figure 4:
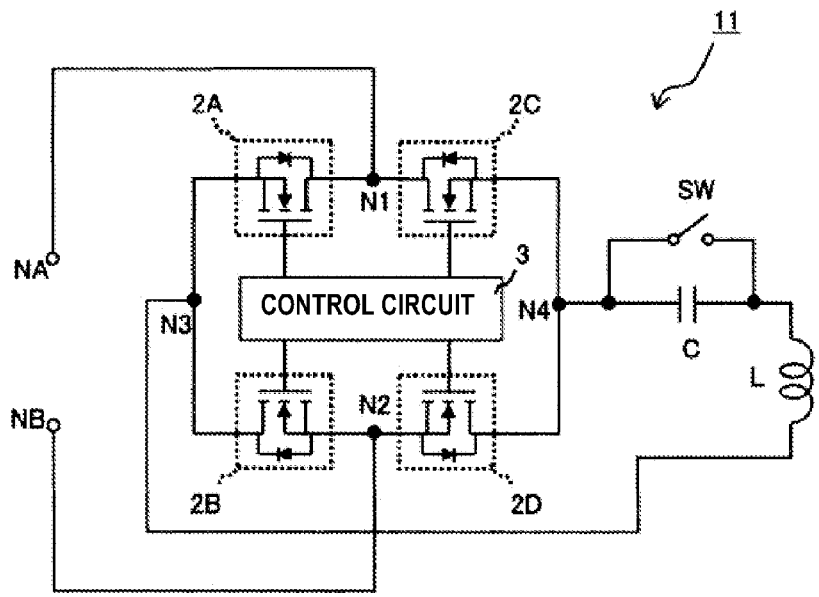
FIG. 4 is a circuit diagram of a wireless power transfer terminal according to a second exemplary embodiment.

FIG. 4 is a circuit diagram of a wireless power transfer terminal 11 according to the present embodiment.

The wireless power transfer terminal 11 includes the FETs 2A to 2D, coil L, control circuit 3, a switch SW, and a resonant capacitor C. The resonant capacitor C is provided between the node N4 and the coil L, and the switch SW is provided in parallel with the resonant capacitor C. The capacitance of the resonant capacitor C is set such that it is connected to the coil L and resonates in series therewith.

For a power transmission mode of the wireless power transfer terminal 11, the control circuit 3 turns off (i.e., opens) the switch SW and connects the resonant capacitor C and the coil L in series; for power reception thereof, the control circuit 3 turns on (i.e., closes) the switch SW and bypasses the resonant capacitor C. Therefore, for power transmission of the wireless power transfer terminal 11, the coil L and the resonant capacitor C can resonate in series, this can increase circuit electromagnetic stored energy, and the capability of supplying electricity can be enhanced and the efficiency of power transmission can be improved.

A wireless power transfer terminal according to a third exemplary embodiment will now be described with reference to FIG. 5. In the following description, the same reference numerals are used for substantially the same configuration as in the second embodiment, and the description thereof is provided above.

Figure 5:
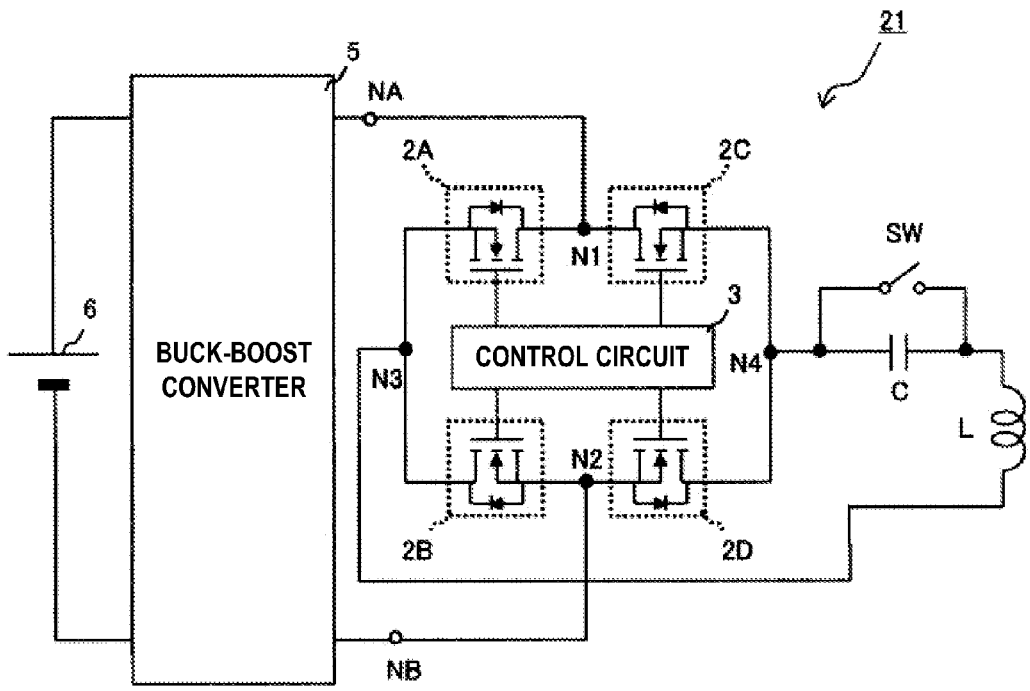
FIG. 5 is a circuit diagram of a wireless power transfer terminal according to a third exemplary embodiment.

FIG. 5 is a circuit diagram of a wireless power transfer terminal 21 according to the present embodiment.

The wireless power transfer terminal 21 includes the FETs 2A to 2D, coil L, control circuit 3, switch SW, resonant capacitor C, a buck-boost converter 5, and a secondary cell 6. The buck-boost converter 5 includes a step-up terminal and a step-down terminal, and the step-up terminal is connected to the input/output nodes NA and NB. The secondary cell 6 is rechargeable, and the opposed ends thereof are connected to the step-down terminal of the buck-boost converter 5. The buck-boost converter 5 can increase a voltage input to the step-down terminal and output the increased voltage from the step-up terminal. The buck-boost converter 5 also can decrease a voltage input to the step-up terminal and output the decreased voltage from the step-down terminal.

For a power transmission mode of the wireless power transfer terminal 21, the buck-boost converter 5 applies an increased voltage (e.g., 10 volts) to which a voltage between the opposed ends of the secondary cell 6 (e.g., 3.0 to 4.2 volts) has been increased between the input/output nodes NA and NB. This enables the wireless power transfer terminal 21 to control power in power transmission and voltage in power transmission, and even if there are a plurality of specifications for voltage in power transmission, power transmission supporting such various specifications can be achieved. Additionally, authentication between devices can be made using, for example, amplitude modulation of voltage in power transmission.

Figure 7:
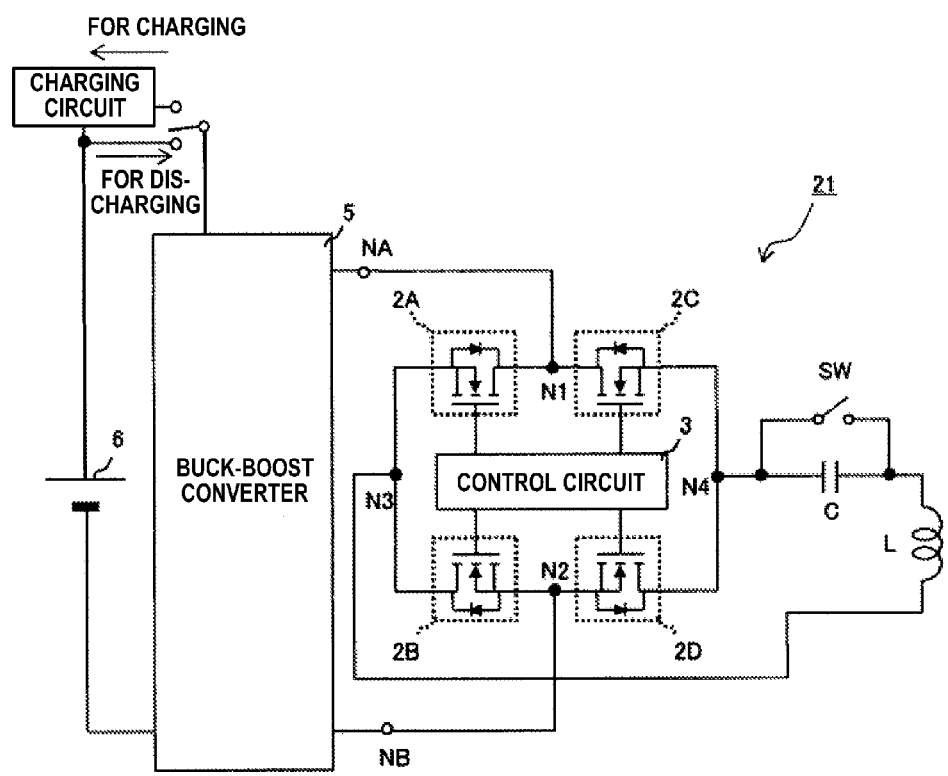
FIG. 7 is a circuit diagram that illustrates a modification example of the wireless power transfer terminal according to the third exemplary embodiment.

For a power reception mode of the wireless power transfer terminal 21, the buck-boost converter 5 decreases a voltage between the input/output nodes NA and NB (e.g., 5 to 15 volts) and applies a charging rated voltage (e.g., 3.0 to 4.2 volts) to the secondary cell 6. This enables, even if there are a plurality of specifications for transmitted voltage, the wireless power transfer terminal 21 to receive power supporting such various specifications. In the case in which an advanced charging control circuit is needed, a discharging route and a charging route of the secondary cell may be switched, as illustrated in FIG. 7.

With the secondary cell and buck-boost converter, for power transmission an alternating-current output can be controlled, and for power transmission a voltage between the opposed ends of the secondary cell can be controlled.

Figure 6:
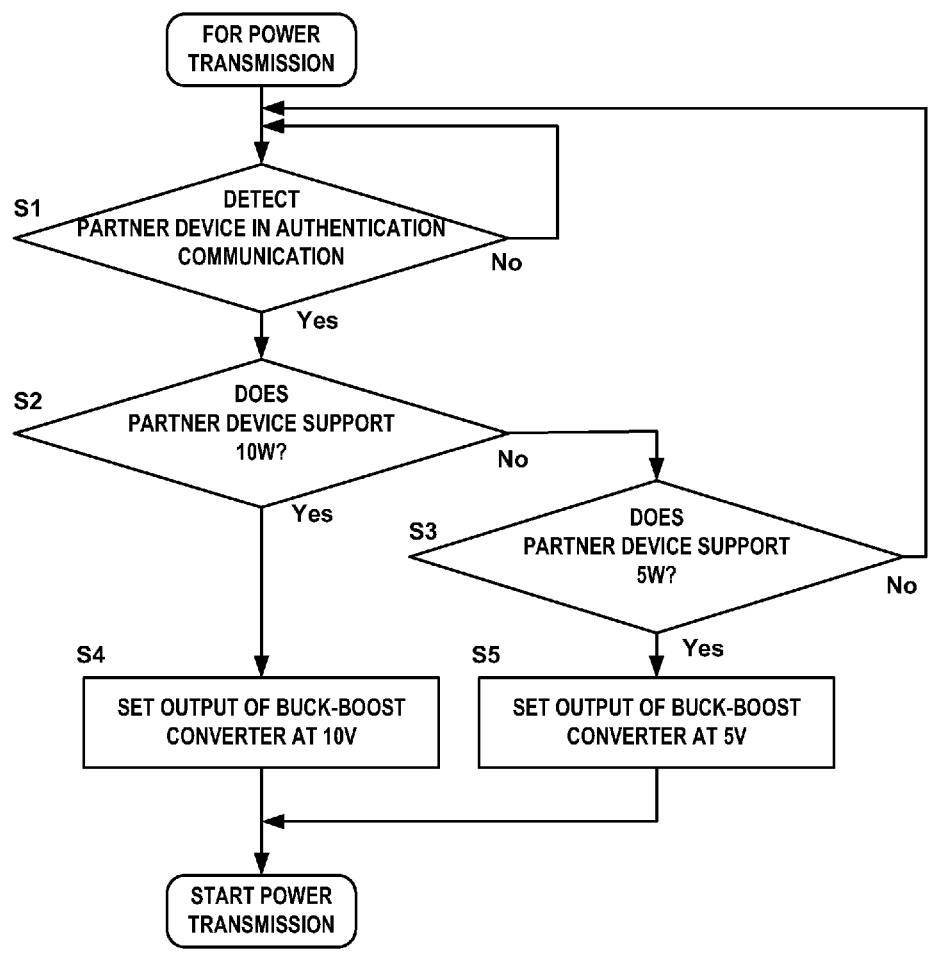
FIG. 6 is an illustration for describing an operational flow of the exemplary wireless power transfer terminal illustrated in FIG. 5.

FIG. 6 is a diagram that illustrates an operational flow for power transmission of the wireless power transfer terminal 21.

For a power transmission mode of the wireless power transfer terminal 21, authentication communication is carried out and a response from a partner device is awaited (step S1). This authentication communication can be carried out by, for example, amplitude-modulating voltage in power transmission with constant periods using, for example, identification code or device code and detecting a response from the partner device from a change in voltage between the opposed ends of the coil. Therefore, the wireless power transfer terminal 21 may preferably be provided with a detector circuit, for example.

Next, the power specification of the partner device is determined (steps S2 and S3). This determination is made by, for example, demodulating the response from the partner device and detecting code specifying the power specification. Therefore, the wireless power transfer terminal 21 may preferably be provided with a demodulating circuit and a code analysis unit.

Next, the output of the buck-boost converter is set such that it is voltage in power transmission corresponding to the power specification of the partner device, and power transmission is started under this setting (steps S4 and S5).

The wireless power transfer terminal 21 transmits power according to the above-described operational flow. With this operation, even if there are a plurality of specifications for voltage in power transmission, power transmission supporting such various specifications can be achieved. Hence, the wireless power transfer terminal 21 can transmit and receive power to and from a plurality of partner devices having different specifications of power used in power transmission and power used in power reception.

The partner device may preferably respond by the load modulation method employing voltage in power transmission in authentication communication of the wireless power transfer terminal 21 and using various kinds of code set in the partner device. Therefore, the wireless power transfer terminal 21 may preferably be provided with a load modulating unit in order to make substantially the same response in authentication communication for power reception.

Device authentication communication using power transmission and reception of signals through a coil can eliminate the necessity of conveying means used for special communication; communication means used for authentication, such as RF-ID, may also preferably be provided.

In embodiments according to the present disclosure a parallel circuit operating as a full-bridge inverter circuit can apply an alternating-current output to the coil, thus enabling the wireless power transfer terminal to transmit power. Also, the parallel circuit operating as a rectifier circuit can rectify an alternating-current input applied from the coil, thus enabling the wireless power transfer terminal to receive power. The use of the semiconductor switching elements of the parallel circuit as both a full-bridge inverter circuit and a rectifier circuit can save the space of the circuit configuration and reduce the cost of manufacturing.

While exemplary embodiments have been described above, it is to be understood that variations and modifications will be apparent to those skilled in the art without departing from the scope and spirit of the disclosure.

That which is claimed is:

1. A wireless power transfer terminal comprising:
a parallel circuit in which a first series circuit and a second series circuit are connected in parallel between opposed ends of the parallel circuit, the first series circuit including first and second semiconductor switching elements connected in series to each other, the second series circuit including third and fourth semiconductor switching elements connected in series to each other;
a coil connected between a connection point of the first semiconductor switching element and the second semiconductor switching element and a connection point of the third semiconductor switching element and the fourth semiconductor switching element; and
a control unit configured to perform switching control of at least the first to fourth semiconductor switching elements.

2. The wireless power transfer terminal according to claim 1, wherein the control unit is configured to perform switching control of at least the first to fourth semiconductor switching elements such that:

in a power transmission mode, the parallel circuit operates as a full-bridge inverter circuit that forms, from an input across the opposed ends of the parallel circuit, an alternating-current output to the coil, and in a power reception mode, the parallel circuit operates as a full-wave rectifier circuit that forms, from an alternating-current input to the coil, an output to the opposed ends of the parallel circuit.

3. The wireless power transfer terminal according to claim 1, wherein:

in the power transmission mode, the control unit is configured to switch between a state in which the first semiconductor switching element and the fourth semiconductor switching element are on and the second semiconductor switching element and the third semiconductor switching element are off, and a state in which the first semiconductor switching element and the fourth semiconductor switching element are off and the second semiconductor switching element and the third semiconductor switching element are on at specific periods, and in the power reception mode, the control unit is configured to turn off, of the first to fourth semiconductor switching elements, at least one of the first to fourth semiconductor switching elements that is connected to a terminal of a power reception load to which a positive voltage is applied and to a terminal of the coil at which a negative voltage is excited and one of the first to fourth semiconductor switching elements that is connected to a terminal of the power reception load to which a negative voltage is applied and to a terminal of the coil at which a positive voltage is excited.

4. The wireless power transfer terminal according to claim 2, wherein:

in the power transmission mode, the control unit is configured to switch between a state in which the first semiconductor switching element and the fourth semiconductor switching element are on and the second semiconductor switching element and the third semiconductor switching element are off, and a state in which the first semiconductor switching element and the fourth semiconductor switching element are off and the second semiconductor switching element and the third semiconductor switching element are on at specific periods, and in the power reception mode, the control unit is configured to turn off, of the first to fourth semiconductor switching elements, at least one of the first to fourth semiconductor switching elements that is connected to a terminal of a power reception load to which a positive voltage is applied and to a terminal of the coil at which a negative voltage is excited and one of the first to fourth semiconductor switching elements that is connected to a terminal of the power reception load to which a negative voltage is applied and to a terminal of the coil at which a positive voltage is excited.

5. The wireless power transfer terminal according to claim 1, further comprising a resonant capacitor connected in series to the coil and a switch unit connected in parallel to the resonant capacitor, wherein the control unit is configured to, for power transmission, turn off the switch unit and make the resonant capacitor resonate with the coil and, for power reception, turn on the switch unit and electrically bypass the resonant capacitor.

6. The wireless power transfer terminal according to claim 2, further comprising a resonant capacitor connected in series to the coil and a switch unit connected in parallel to the resonant capacitor, wherein the control unit is configured to, for power transmission, turn off the switch unit and make the resonant capacitor resonate with the coil and, for power reception, turn on the switch unit and electrically bypass the resonant capacitor.

7. The wireless power transfer terminal according to claim 3, further comprising a resonant capacitor connected in series to the coil and a switch unit connected in parallel to the resonant capacitor, wherein the control unit is configured to, for power transmission, turn off the switch unit and make the resonant capacitor resonate with the coil and, for power reception, turn on the switch unit and electrically bypass the resonant capacitor.

8. The wireless power transfer terminal according to claim 4, further comprising a resonant capacitor connected in series to the coil and a switch unit connected in parallel to the resonant capacitor, wherein the control unit is configured to, for power transmission, turn off the switch unit and make the resonant capacitor resonate with the coil and, for power reception, turn on the switch unit and electrically bypass the resonant capacitor.

9. The wireless power transfer terminal according to claim 1, wherein each of the semiconductor switching elements is an FET element.

10. The wireless power transfer terminal according to claim 2, wherein each of the semiconductor switching elements is an FET element.

11. The wireless power transfer terminal according to claim 3, wherein each of the semiconductor switching elements is an FET element.

12. The wireless power transfer terminal according to claim 4, wherein each of the semiconductor switching elements is an FET element.

13. The wireless power transfer terminal according to claim 1, further comprising:

a rechargeable secondary cell; and a buck-boost converter circuit configured to, in the power transmission mode, increase a voltage between opposed ends of the secondary cell and apply the increased voltage to the opposed ends of the parallel circuit and, in the power reception mode, decrease a voltage between the opposed ends of the parallel circuit and apply the decreased voltage to the opposed ends of the secondary cell.

14. The wireless power transfer terminal according to claim 2, further comprising:

a rechargeable secondary cell; and a buck-boost converter circuit configured to, in the power transmission mode, increase a voltage between opposed ends of the secondary cell and apply the increased voltage to the opposed ends of the parallel circuit and, in the power reception mode, decrease a voltage between the opposed ends of the parallel circuit and apply the decreased voltage to the opposed ends of the secondary cell.

15. The wireless power transfer terminal according to claim 3, further comprising:

a rechargeable secondary cell; and a buck-boost converter circuit configured to, in the power transmission mode, increase a voltage between opposed ends of the secondary cell and apply the increased voltage to the opposed ends of the parallel circuit and, in the power reception mode, decrease a voltage between the opposed ends of the parallel circuit and apply the decreased voltage to the opposed ends of the secondary cell.

16. The wireless power transfer terminal according to claim 4, further comprising:

a rechargeable secondary cell; and a buck-boost converter circuit configured to, in the power transmission mode, increase a voltage between opposed ends of the secondary cell and apply the increased voltage to the opposed ends of the parallel circuit and, in the power reception mode, decrease a voltage between the opposed ends of the parallel circuit and apply the decreased voltage to the opposed ends of the secondary cell.

17. The wireless power transfer terminal according to claim 1, wherein the control unit is configured to carry out mutual device authentication communication with a partner device coupled to the coil and variably control transmitting power or received power according to the partner device.

18. The wireless power transfer terminal according to claim 2, wherein the control unit is configured to carry out mutual device authentication communication with a partner device coupled to the coil and variably control transmitting power or received power according to the partner device.

19. The wireless power transfer terminal according to claim 3, wherein the control unit is configured to carry out mutual device authentication communication with a partner device coupled to the coil and variably control transmitting power or received power according to the partner device.

20. The wireless power transfer terminal according to claim 4, wherein the control unit is configured to carry out mutual device authentication communication with a partner device coupled to the coil and variably control transmitting power or received power according to the partner device.

* * * * *